Dec. 25, 1934.　　　J. C. WHITE　　　1,985,704
GREASE TRAP
Filed Nov. 7, 1930
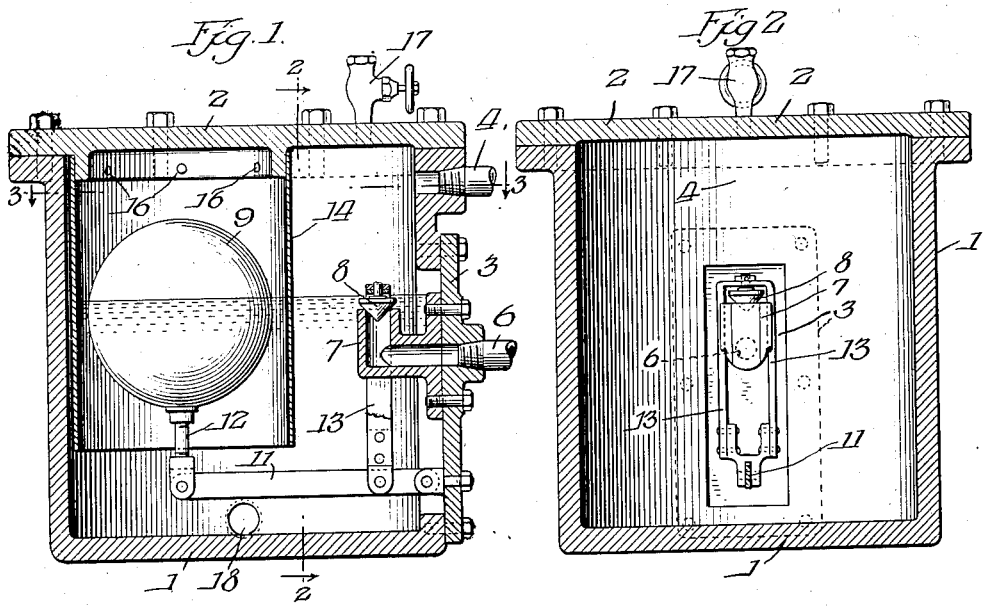
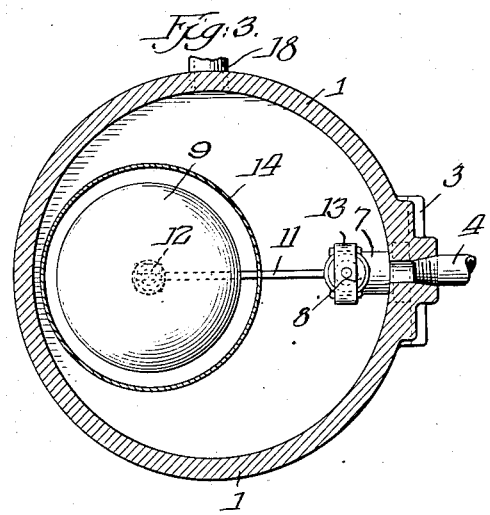
Inventor.
John C. White.
Witness:
R. B. Davison
By Wilson, Dowell, McCanna & Rehm
Attys Patented Dec. 25, 1934

1,985,704

UNITED STATES PATENT OFFICE 1,985,704

GREASE TRAP

John C. White, Madison, Wis., assignor, by direct and mesne assignments, to The Hydro-Heater Corporation, Madison, Wis., a corporation of Wisconsin Application November 7, 1930, Serial No. 494,178

2 Claims. (Cl. 210—54)

This invention relates to traps and more particularly to traps that are well adapted for service in receiving exhaust steam and water and in removing oil or other foreign matters therefrom. Considerable difficulty has been experienced with traps in the past which have been used in said service due to fouling of the working parts such as the float and valve operating mechanisms, and to temperature and pressure changes resulting in inconsistent and variable performance.

In accordance with this invention these and other difficulties are overcome by providing a skimming outlet at or near the point of flotation of the ball float to remove any foreign matter such as floating oil or grease from the surface of the liquid without removing or disturbing the body of liquid below that point. Fouling of the working parts is prevented by placing substantially all of the mechanisms below the liquid level in the trap and also by providing an independent vented float chamber to protect the float from fouling. By these and other novel features a trap is provided which will serve satisfactorily over long periods of time during which time uniform service is assured.

A better understanding of this invention will be obtainable from the following description given in connection with the drawing in which:

Fig. 1 is a transverse vertical section taken through approximately the center of the trap.

Fig. 2 is a section on line 2—2 of Fig. 1 illustrating the valve linkage, and

Fig. 3 is a horizontal section taken on line 3—3 of Fig. 1.

As can be seen from the drawing the trap comprises a cylindrical body or casing 1 which is enclosed by a top cover plate 2 and a side valve plate 3. An inlet connection 4 is provided for admitting fluid such as steam, oil, water and other products of condensation into the trap. An outlet connection 6, threaded to the valve plate 3, is also provided to carry off the discharge of the trap when valve 8 is open. The outlet connection is controlled by a valve comprising a valve seat member 7 in the form of an L shaped bracket bolted or otherwise secured to the inner side of valve plate 3. The bracket is bored to establish communication with outlet connection 6 and is disposed with its inner inlet opening terminating at or slightly below the liquid level to be maintained in the body. The inner discharge end terminates in a valve seat and is controlled by a valve cone 8.

The valve 8 is actuated and controlled by a float 9 by means of a lever 11 pivotally connected at one end to a rod 12, attached to the float, and at its other end to the valve plate. Intermediate its ends lever 11 is pivotally connected to a yoke bracket 13 which engages the valve cone 8 to raise and lower the same from its seat in accordance with movements of the float. As can be seen the float will rise as the trap fills and at a predetermined level will open valve 8.

The entire valve operating mechanism is disposed in the lower portion of the body well below the liquid level to be maintained in the body. Accordingly the only part of the valve mechanism which is subject to the surface liquors is the valve cone.

The float 9 is so constructed and adjusted relatively to the valve 8 that its line of flotation is substantially at or slightly above the intake end of valve 8 and seating member 7.

The float 9 is disposed within a distinct and separate float chamber formed by a partition 14 which divides the body into two communicating chambers one containing the float, the other containing the valve and valve actuating mechanisms. In this particular instance the partition 14 is in the form of a cylindrical sleeve which is secured to the cover 2 and surrounds the float. The sleeve extends into proximity to the bottom of the body. In view of the fact that the partition does not extend to the bottom the two chambers are in communication with each other.

The upper portion of the float chamber is vented to the body by means of apertures 16 formed around the upper end of partition 14, said vents, together with the communication existing at the bottom of the float chamber, serving to put the two chambers in both hydrostatic and pressure balance. The body may also be vented to the atmosphere by a hand vent valve 17 threaded into the cover 2 although in the average installations a vent valve is not necessary due to the fact that the discharge or outlet connection usually discharges into the atmosphere or a container vented to the atmosphere.

For blow down purposes the body may be provided with an outlet 18 adjacent the bottom of the body.

From the foregoing description it will be seen that means are provided for skimming foreign matters such as oils and discharging excess condensation from the trap without materially disturbing the main body of liquid in the trap. Substantially the entire valve actuating mechanism is also disposed within the main body of liquid below the foreign matters, such as oil, which float upon the top of the liquid. Furthermore the float is protected from becoming fouled or coated with the oils by means of the baffle or sleeve 14 which substantially isolates the float. By removing or skimming any floating oil from the top of the body of liquid without disturbing the liquid below that point, sufficient time is given for any entrained oil or grease which has been carried down into the body of liquid to float to the top. This action also takes place during the filling of the trap before the float has reached sufficient height to raise the valve. Due to the fact that the operative mechanisms are all disposed below the outlet in the body and well within the body of the liquid which is not materially changed during discharge or filling periods these mechanisms are not subject to large variations in temperatures or pressures.

It is obvious that minor changes may be made in the details of construction without departing from the spirit and scope of this invention as defined in the claims.

I claim:

1. A trap comprising a body provided with an inlet near the upper portion thereof, a conduit extending into said body terminating at an upwardly facing port within the body just silghtly below the maximum liquid level therein and arranged to conduct liquid from said port downwardly and to the outside of said body, a downwardly closing valve arranged to seat on said port, said port being positioned for skimming oil floating on the surface at said liquid level, a chamber in said body open to said body only at its upper and lower ends extending from near the bottom of the body to a level well above the maximum liquid level having imperforate side walls to keep floating oil from the interior thereof, a float within said chamber and means extending around the lower end of said chamber connecting the float and valve arranged to open the latter whenever the liquid level rises slightly above said port, said valve, inlet and port being outside said chamber.

2. A trap comprising a body, an inlet in the upper portion thereof, an outlet connection having an upwardly facing opening downwardly discharging therefrom located just low enough below the maximum liquid level in said body to skim oil floating on the surface of the liquid, a valve arranged to close said opening, a chamber in said body open to said body only at its upper and lower ends extending from near the bottom of the body to a level well above the maximum liquid level having imperforate side walls to keep floating oil from the interior thereof, a float within said chamber and means extending around the lower end of said chamber connecting the float and valve to open the latter when the liquid level in the body rises just high enough above said outlet opening to facilitate shallow skimming of the floating oil, said valve, inlet and port being outside said chamber.

JOHN C. WHITE.